US011939812B2

(12) United States Patent
Pope et al.

(10) Patent No.: US 11,939,812 B2
(45) Date of Patent: *Mar. 26, 2024

(54) PROTECTIVE PANEL AND METHOD OF MANUFACTURE AND USE

(71) Applicant: Entry Point International, LLC., Wilmington, MA (US)

(72) Inventors: David Gregory Pope, West Newbury, MA (US); James Michael Pidhurney, Auburn, NH (US)

(*) Notice: Subject to any disclaimer, the term of this patent is extended or adjusted under 35 U.S.C. 154(b) by 138 days.

This patent is subject to a terminal disclaimer.

(21) Appl. No.: 17/648,960

(22) Filed: Jan. 26, 2022

(65) Prior Publication Data

US 2022/0145696 A1    May 12, 2022

Related U.S. Application Data

(63) Continuation of application No. 16/703,474, filed on Dec. 4, 2019, now Pat. No. 11,268,319.

(60) Provisional application No. 62/775,289, filed on Dec. 4, 2018.

(51) Int. Cl.
| | |
|---|---|
| *B32B 7/12* | (2006.01) |
| *B32B 3/12* | (2006.01) |
| *B32B 27/08* | (2006.01) |
| *B32B 27/32* | (2006.01) |
| *E06B 5/10* | (2006.01) |
| *E06B 7/28* | (2006.01) |

(52) U.S. Cl.
CPC ............... *E06B 5/10* (2013.01); *B32B 3/12* (2013.01); *B32B 7/12* (2013.01); *B32B 27/08* (2013.01); *B32B 27/32* (2013.01); *E06B 7/28* (2013.01); *B32B 2307/558* (2013.01); *B32B 2419/00* (2013.01)

(58) Field of Classification Search
CPC .......... B32B 13/12; B32B 15/02; B32B 15/08; B32B 15/088; B32B 15/09; B32B 15/098; B32B 21/02; B32B 21/08; B32B 21/14; B32B 2262/0261; B32B 2262/0276; B32B 2262/04; B32B 2262/062; B32B 2307/414; B32B 2307/558; B32B 2307/732; B32B 2419/00; B32B 2571/00; B32B 2607/00; B32B 27/065; B32B 27/08; B32B 27/12; B32B 27/281; B32B 27/30; B32B 27/302; B32B 27/304; B32B 27/308; B32B 27/32; B32B 27/34; B32B 27/36; B32B 27/365; B32B 27/42; B32B 3/12; B32B 5/02; B32B 5/18; B32B 7/12; E06B 2009/005; E06B 5/10; E06B 5/103; E06B 7/28; E06B 9/02
See application file for complete search history.

(56) References Cited

U.S. PATENT DOCUMENTS

| | | | |
|---|---|---|---|
| 11,268,319 B2* | 3/2022 | Pope | B32B 21/02 |
| 2006/0048403 A1* | 3/2006 | Brister | B60J 1/2011 |
| | | | 33/566 |

* cited by examiner

*Primary Examiner* — Lawrence D Ferguson
(74) *Attorney, Agent, or Firm* — Talus Law Group LLC

(57) ABSTRACT

The present invention is directed to an apparatus and system involving the use of a panel for protecting fenestrations in buildings such as windows and doors, from damage caused by storms, tornadoes, hurricanes, riots, and the like. Embodiments of the present invention include a substrate panel attached to a security film providing increased protection against wind-driven missiles associated with high winds with decreased weight and mitigating improper installation.

20 Claims, 10 Drawing Sheets

PROTECTIVE PANEL AND METHOD OF MANUFACTURE AND USE

CROSS REFERENCE TO REFERENCE TO RELATED APPLICATIONS

This patent application is a continuation of U.S. patent application Ser. No. 16/703,474 filed Dec. 4, 2019, now U.S. patent Ser. No. 11/268,319, which claims the benefit of U.S. Provisional Patent Application 62/775,289 entitled "PROTECTIVE PANEL AND METHOD OF MANUFACTURE AND USE" filed on Dec. 4, 2018, the entire contents of which are incorporated herein by reference in their entirety for all purposes.

FIELD OF THE INVENTION

The present invention is directed to an apparatus and system involving the use of a panel for protecting fenestrations in buildings such as windows and doors, from damage caused by storms, tornadoes, hurricanes, riots, and the like. In contrast to existing building protective paneling commonly used for such applications, the panel of the present invention is comparatively lightweight, thin, and superior at resisting penetration from impact while having resistance to moisture, and having light transmissive properties.

BACKGROUND OF THE INVENTION

Annually hurricanes, tornadoes, and other intense weather events—herein referred to as hurricanes—leave in their wake tens of billions of dollars in damage. A portion of this damage is damage due to wind-driven projectiles impacting buildings. Building fenestrations, such as windows and doors, are particularly susceptible. It is common practice, in preparation for forecast storms, for building owners and business owners alike to protect such penetrations of a building using common construction materials such as sheet goods.

The protection of such fenestrations results in the protection of not only the structure, but also to the tenants and businesses within. It is not uncommon for storm debris, objects carried by the winds of the hurricane, to be found driven through structures at high wind-speeds. These wind-speeds of hurricanes are known to reach over 150 mph and the wind-speed of tornadoes are known to reach well over 200 mph. Outdoor debris such as tree limbs, as well as debris generated from destruction of structures such as wood framing members from storm-affected structures can become highly damaging and dangerous missiles.

Standards such as ASTM E1886, ASTM E1996, ASCE 7, Florida Building Code TAS 201, TAS 202, TAS 203, SBCCI, and SST-12-97 have been enacted specifically for the purpose of providing safe guidelines and code regulations regarding the design, testing and protection of structures from storm events.

For instance, ASTM E-1996 dictates separate levels of protection wherein a missile comprising a 2×4 of varying sizes and weights are directed at a test panels at varying speeds according to different levels of protection. The panel is inspected after impact and assessed on a pass/fail basis according to the code. For instance, see Table 2 from ASTM E-1996 below:

TABLE 2

Applicable Missiles

| Missile Level | Missile | Impact Speed (m/s) |
|---|---|---|
| A | 2 g ± 5% steel ball | 39.62 (130 f/s) |
| B | 910 g ± 100 g (2.0 lb. ± 0.25 lb.) 2 × 4 in. 52.5 cm ± 100 mm (1 ft - 9 in. ± 4 in.) lumber | 15.25 (50 f/s) |
| C | 2050 g ± 100 g (4.5 lb. ± 0.25 lb.) 2 × 4 in. 1.2 m ± 100 mm (4 ft ± 4 in.) lumber | 12.19 (40 f/s) |
| D | 4100 g ± 100 g (9.0 lb. ± 0.25 lb) 2 × 4 in. 2.4 m ± 100 mm (8 ft ± 4 in.) lumber | 15.25 (50 f/s) |
| E | 4100 g ± 100 g (9.0 lb. ± 0.25 lb.) 2 × 4 in. 2.4 m ± 100 mm (8 ft ± 4 in.) lumber | 24.38 (80 f/s) |

Availability of materials, ease of installation, and reusability of materials which meet such standards are commonly difficult to obtain, transport, and install in a timely and effective manner in view of an expected storm.

In light of the necessity for safety and protection of buildings and building occupants, there exists a need for a protective panel system which meets the applicable safety code, is readily available, easy to install, reusable and lightweight.

SUMMARY OF THE INVENTION

It is common practice when a hurricane is forecast, for individuals to purchase wood sheet-goods (e.g. plywood) to attach to a structure to protect building fenestrations. The use of plywood as a solution for storm-proofing is lacking due to a number of reasons. Plywood comes in a number of thicknesses and grades. While a variety of thicknesses and types are available, only certain types of plywood and certain thicknesses are effective for storm-wind protection. It has been determined for instance that exterior-grade plywood of 1.59 cm (⅝ in) thickness or greater should be used for hurricane protection. The availability of 1.59 cm (⅝ in) plywood is not as common as 1.27 cm (0.5 in) plywood, and the use of thicker plywood results in unnecessary cost and weight increase. Furthermore, it is difficult to differentiate between exterior-grade and interior-grade plywood. While exterior-grade is able to provide appropriate protection levels, interior grade plywood when exposed to moisture can rapidly deteriorate resulting in loss of strength. Thus, the use of the wrong grade of plywood, or the use of the wrong thickness in plywood can result in inadequate protection from hurricane events. It will be appreciated that embodiments of the present invention described herein surround the protecting against expected hurricane events. However, it will be further appreciated that the use of the present invention for the patching and covering of damage following a hurricane, such as due to wind-driven projectiles, is within the spirit and scope of the present invention.

Another shortfall of existing sheet-goods is potential confusion of uninformed consumers of the use of plywood versus the use of oriented strand board, commonly referred to as "OSB." Plywood is constructed of multiple layers of wood plies, wherein each ply has grain direction aligned with the length or the width, and each ply layer is orthogonal to the adjacent ply. OSB, in contrast to plywood, is constructed is manufactured from cross-oriented layers of thin, rectangular wooden strips compressed and bonded together with wax and synthetic resin adhesives. OSB is stronger in shear and has favorable mechanical properties for load bearing structures at a lower cost, thus its increased popularity and availability. However, in use for protection during storms, OSB is unable to provide the same levels of protection as plywood. Furthermore, OSB is more prone to the absorption of water and deterioration, resulting in inadequate protection from hurricane events.

It is an aspect of embodiments of the present invention to provide a protective panel for use in hurricane protection wherein the protective panel is intended for hurricane protection use, and the level of protection is clear to the consumer.

Certain solutions for the protection of structures and fenestrations, such as the use of sheet-goods, results in the blocking of light from passing into a space. Additionally, the appearance of a structure with sheet-goods covering windows and doors is often perceived as an abandoned structure and may result in a higher incidence of crime.

It is an aspect of embodiments of the present invention to provide a protective panel which allows light to transmit from the exterior to the interior of a building. In certain embodiments, the protective panel has a translucent characteristic such that while light passes through from exterior to interior, the presence or absence of personnel within is not discernable from the external of the building—thereby decreasing chances of crime such as break-ins or looting. It is a further aspect of the present invention for a protective panel to provide auxiliary lighting through the use of integrated light solutions in the event of a power outage which further deters potential crime or looting. It is a further aspect of certain embodiments for a protective panel to comprise printed matter including imagery, such as of a window, such that the protective panel resembles the structure or fenestration which it protects.

Existing solutions surrounding the use of sheet-goods are heavy, non-reusable, and difficult to transport. A sheet of 1.59 cm (⅝ in) plywood rated of appropriate rating for use in hurricane protection weighs approximately 24.9 kg (55 lbs). Thus, the purchase of multiple sheets of plywood is cumbersome and requires special equipment or specialized vehicles for transporting multiple units at a time. Furthermore, the availability of certain thicknesses of plywood such as 1.59 cm (⅝ in) thick plywood may have limited availability. In absence of 1.59 cm (⅝ in) thick plywood, one would need to purchase the next thickest option of plywood which is commonly 1.91 cm (0.75 in) thick plywood which weighs approximately 31.8 kg (70 lbs).

It is an aspect of the present invention to provide a protective panel at a weight which can be easily stocked, easily purchased, and easily transported while providing sufficient protection per published standards for hurricane protection. Certain embodiments of the present invention comprise a protective panel which meet ASTM E-1996 protection standards at a decreased weight. Certain embodiments of the present invention comprise a protective panel having a size of 1.2 m (4 ft)×2.4 m (8 ft) and weigh approximately 2.72 kg (6 lbs). Certain embodiments of the present invention comprise a protective panel having a size of 1 m (3.28 ft)×2.25 m (7.38 ft). It will be appreciated that although certain embodiments comprising protective panels of a particular size are discussed herein, protective panels having alternative dimensions—greater or lesser than dimensions discussed herein—are within the spirit and scope of the present invention.

Furthermore, a polymeric based protective panel—as provided in certain embodiments of the present invention—allows the ease of transport, installation, removal, and storage of panels. The polymeric composition allows the use of the protective panel in a moisture rich environments, such as in hurricane events, without degradation of protective characteristics. Thus, protective panels of the present invention are reusable. Conversely, plywood can only be safely used once in protection of a building as the moisture retention and mold growth during storage attempts result in degradation of material properties and thereby degradation of level of protection provided.

The composition of a protective panel with the attachment of at least one security film to at least one substrate panel provides increased protection wherein the substrate panel provides a level impact protection and the security film provides a level of tensile strength. The combination of the substrate panel with the security film provides an increased level of protection than either as an independent panel.

A problem surrounding existing solutions for hurricane protection involves the improper installation of the sheet-good to a structure. Installers are sometimes unaware to the level of protection that a sheet-good provides. Installers are sometimes unaware to the proper size to cut a sheet-good for a given fenestration. Furthermore, installers are sometimes unaware as to the maximum spacing between fasteners and how far the fasteners should be offset from an edge for the purposes of fastening a panel to a structure. For instance, using too few fasteners, fasteners which are spaced too far apart, or using fasteners too close to an extent of a panel may result in tear-through. Tear-through occurs when an object or high-wind impacts the sheet-good and results in the fasteners being torn through the edge as the sheet-good flexes in an inward direction as a result of impact. In such situations, the panel is not able to provide protection to its full capacity due to improper installation.

It is an aspect of the present invention to provide instructions, protection level, and installation guides for proper application of a protective panel. In certain embodiments an installation guide comprises a guide for cutting panels appropriate sizing for fenestrations. These cutting guides provide a visual cue for cutting panels to size, but may also be used for purpose such as communicating to installers the maximum fasteners spacing for fastening the protective panel to a structure, and minimum offset of fasteners from an extent of a protective panel.

These and other advantages will be apparent from the disclosure of the inventions contained herein. The above-described embodiments, objectives, and configurations are neither complete nor exhaustive. As will be appreciated, other embodiments of the invention are possible using, alone or in combination, one or more of the features set forth above or described in detail below. Further, this Summary is neither intended nor should it be construed as being representative of the full extent and scope of the present invention. The present invention is set forth in various levels of detail in this Summary, as well as in the attached drawings and the detailed description below, and no limitation as to the scope of the present invention is intended to either the inclusion or non-inclusion of elements, components, etc. in this Summary. Additional aspects of the present invention will become more readily apparent from the detailed description, particularly when taken together with the drawings, and the claims provided herein.

DETAILED DESCRIPTION OF VARIOUS EMBODIMENTS

Figure 1:
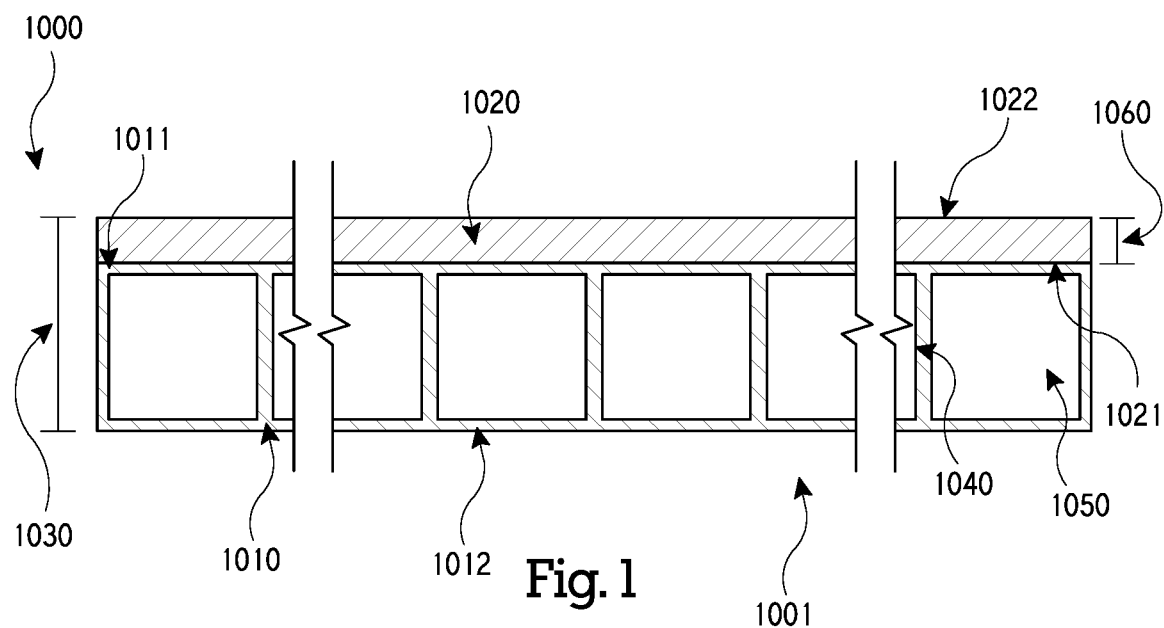
FIG. 1—A cross-sectional side-view of certain embodiments comprising a protective panel FIG. 2A-A cross-sectional side-view of certain embodiments comprising a protective panel FIG. 2B-A cross-sectional side-view of certain embodiments comprising a protective panel FIG. 2C-A cross-sectional side-view of certain embodiments comprising a protective panel FIG. 3A-A front view of certain embodiments of a protective panel FIG. 3B-A side cross-sectional view of certain embodiments of a protective panel having fasteners disposed therethrough FIG. 4A-A front view of certain embodiments comprising a protective panel having a cutting guide FIG. 4B-A front view of certain embodiments comprising a protective panel having a cutting guide FIG. 5—A front view of certain embodiments comprising a protective panel affixed to a structure FIG. 6—A side cross-sectional view of certain embodiments of a protective panel having fasteners disposed through a reinforced area FIG. 7—A front view of certain embodiments comprising a protective panel having printed matter

Certain embodiments of the present invention, such as shown in FIG. 1, comprise protective panel 1000 comprising a substrate panel 1010 having a security film 1020 attached thereto, wherein a first side 1021 of the security film is attached to the first side 1011 of the substrate panel.

In certain embodiments, such as shown in FIG. 1, the substrate panel 1010 has a thickness 1030 and comprises a first side 1011, a second side 1012 parallel to the first side, and fluted construction therebetween. The fluted construction of such panels is typically characterized by intermediate walls 1040 which are perpendicular to the first side 1011. The walls 1040 of such an embodiments typically results in a rectilinear array of flutes 1050. Certain embodiments comprise a substrate panel which is extruded during a manufacturing process, however alternative embodiments employ alternative manufacturing methods while keeping with the spirit and scope of the present invention. Although flutes having a rectangular profile are disclosed, a substrate panel 1010 having flute profiles varying in size or shape from those disclosed herein, such as an "O" shape, are within the spirit and scope of the present invention.

In certain embodiments, the fluted construction of a substrate panel comprises a corrugated form, wherein the fluted construction is characterized by a first side, a second side parallel to the first side, and a corrugated material therebetween. It will be appreciated that a corrugated material is characterized by a series of parallel alternating ridges and furrows such as found in cardboard products.

The substrate panel of certain embodiments comprises a material composition of one or more of the following materials: fluted plastic, solid plastic, wire mesh, plastic mesh, cardboard, Masonite, plywood, metal, foam, foamboard, gypsum board, high density gypsum board, sheathing substrates, wood sheets, acrylic, polycarbonate, vinyl, oriented strand board, and fabric (e.g. polyester, nylon, cotton, rayon, recycled plastic based fabric). It will be appreciated however, that alternative embodiments of the present invention comprising a substrate panel of other material composition are within the spirit and scope of the present invention.

In certain embodiments, the security film of a protective panel comprises polyester, or polyethylene terephthalate (commonly referred to as PET). Certain embodiments comprise a security film comprising one or more of the following materials: acrylic, polycarbonate, polyvinyl chloride (PVC), polyethylene terephthalate glycol (PETG), phenolics, ultra-high molecular weight polyethylene (UHMW-PE), acrylonitrile butadiene styrene (ABS), polyoxymethylene (POM), polyamide-imide (PAI), polyimide (PI), and nylon. It will be appreciated however, that alternative embodiments of the present invention comprising a security films of other material composition are within the spirit and scope of the present invention. It will be further appreciated that a security film comprising a film, sheet, or panel herein referred to as "security film", are within the spirit and scope of the present invention.

In certain embodiments, as shown in FIG. 1, a first side 1001 of the protective panel is configured to face away from a structure, while a second side 1002 of the protective panel is configured to face toward a structure when affixed to the structure. In alternative embodiments it will be appreciated that the installation of a panel wherein the first side is affixed against a structure is within the spirit and scope of the present application.

Figure 2A:
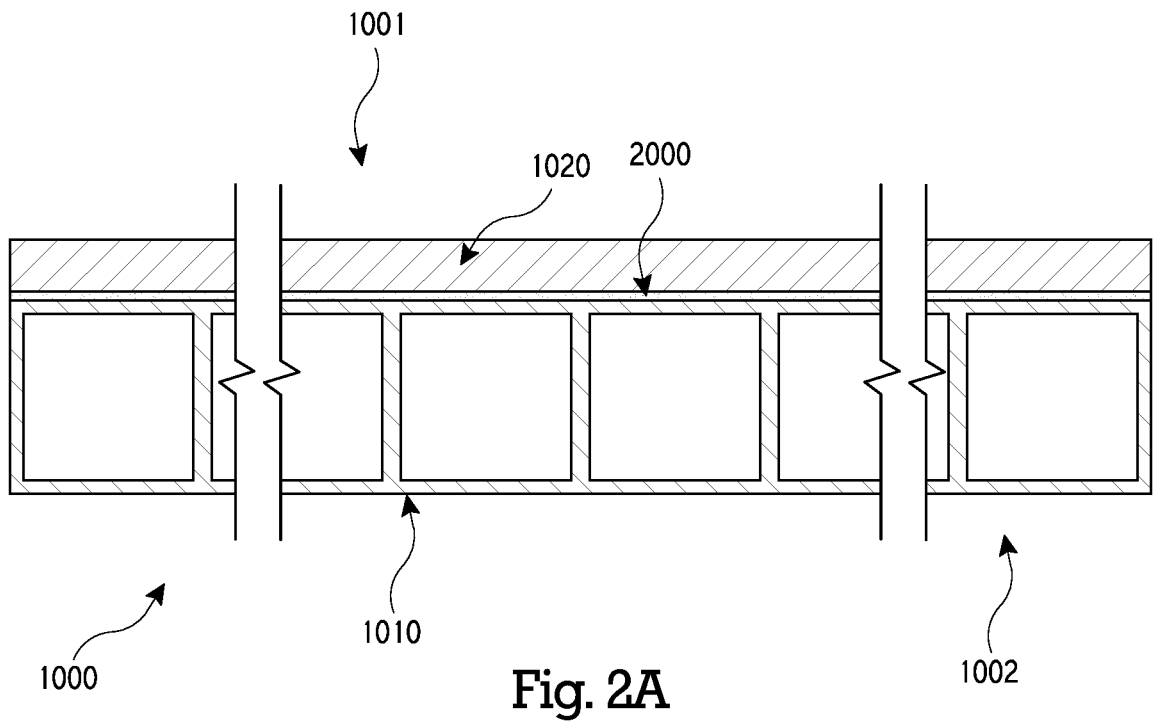

In certain embodiments, such as shown in FIG. 2A, the attachment of a security film 1020 to a substrate panel 1010 comprises an adhesive layer 2000 disposed between adjacent faces of the security film 1020 and the substrate panel 1010. In certain embodiments, the adhesive layer 2000 comprises a spray adhesive applied to the security film 1020 or the substrate panel 1010 prior to the attachment of the substrate panel to the security film. Certain embodiments comprise one or more of the following adhesives: vinyl acetate, polyvinyl acetate, cyanoacrylate, hot melt polymers, pressure sensitive adhesives (PSA), spray adhesives, contact adhesives, epoxy, polyurethane, or water-based adhesives. It will be appreciated however, that alternative embodiments of the present invention comprising an adhesive layer of other material compositions are within the spirit and scope of the present invention.

The application of adhesives between a substrate panel in certain embodiments comprise one or more of the following methods: spray application, roll-on, brush-on, dipping, knife rolling, vacuum deposition, and powder coating. Alternatively, an adhesive comprising solid and liquid properties are held in a fluidized bed prior to application. It will be appreciated however, that alternative embodiments of the present invention comprise other methods of application of adhesive for the attachment of a security film to a substrate panel are within the spirit and scope of the present invention.

Certain embodiments of a protective panel comprising a substrate panel and security film attached to each other using alternative method such as hot roll lamination or other embedding technologies known to those skilled in the art. It will be appreciated that the combination of a substrate panel with a security panel during manufacture may be desirable for purposes such as cost and time for manufacture.

Figure 2B:
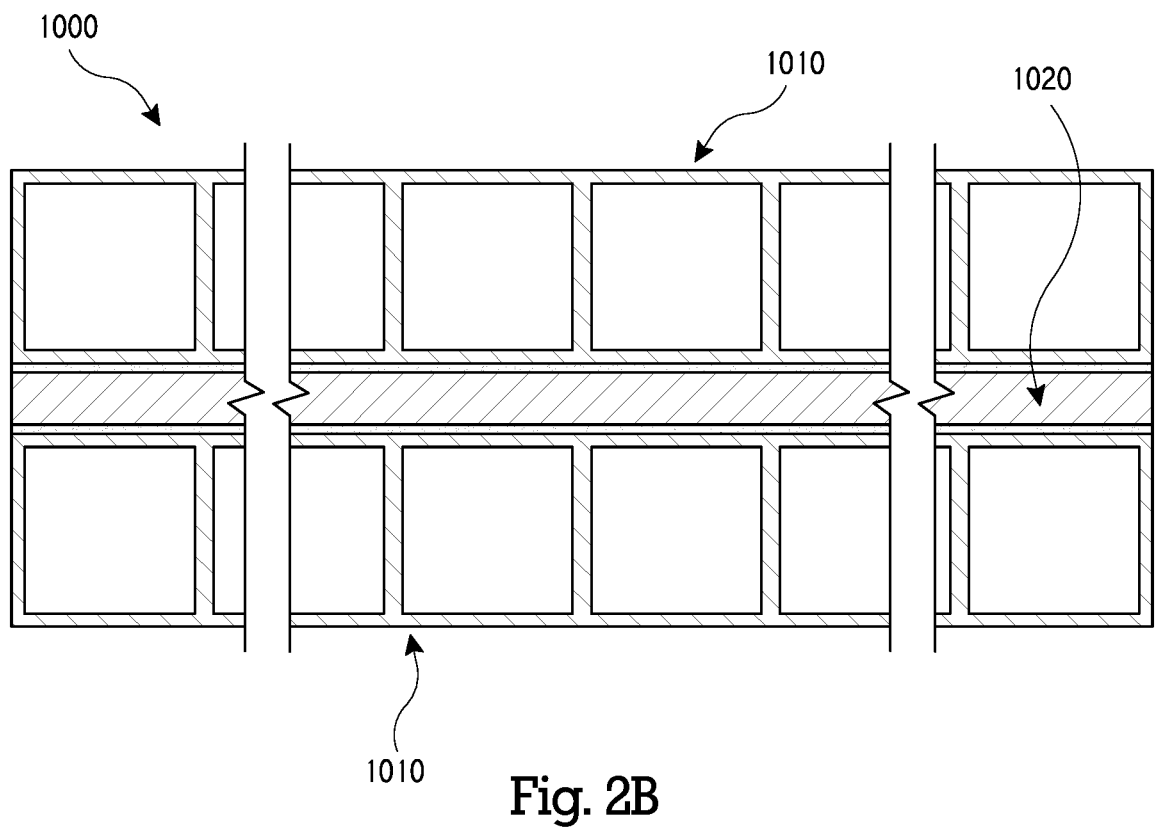
Figure 2C:
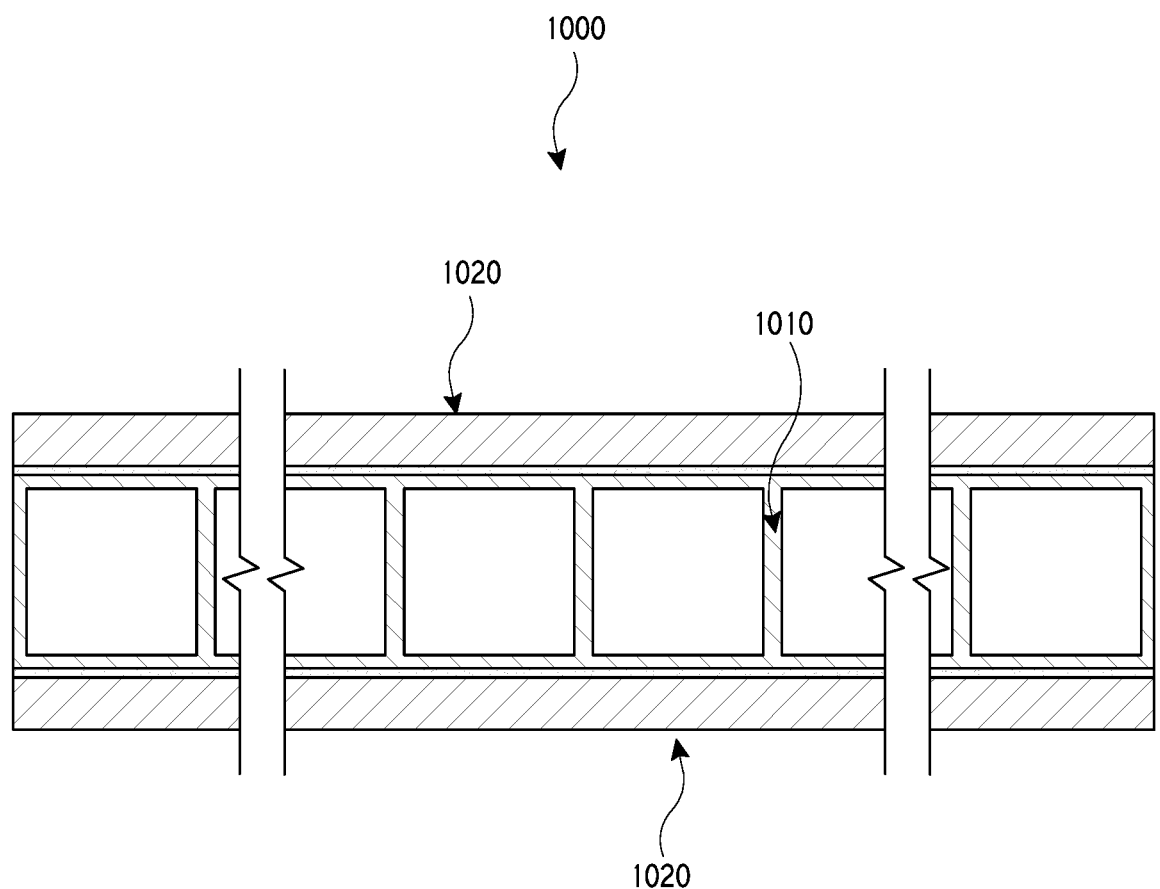

A protective panel 1000 of certain embodiments, such as shown in FIG. 2A, comprise a security film 1020 attached to a substrate panel 1010. Alternative embodiments, such as shown in FIG. 2B, comprise a first substrate panel 1010, a second substrate panel 1010, and a security film 1020 attached therebetween. Yet another alternative embodiments, such as shown in FIG. 2C, comprise a first security film 1020, a second security film 1020, and a substrate panel 1010 attached therebetween.

Figure 3A:
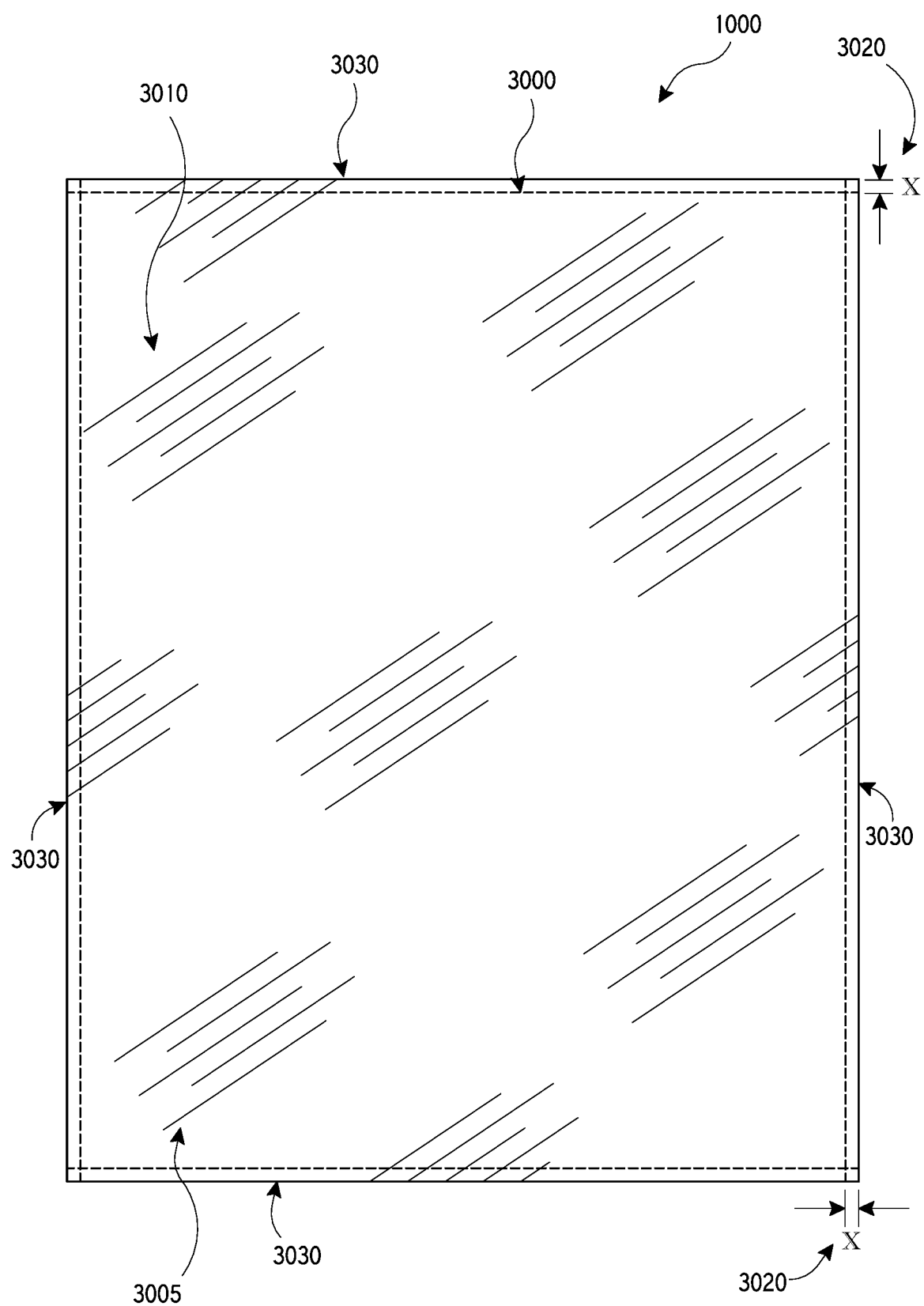

Certain embodiments, as shown in FIG. 3A, comprise a border 3000 visible from an external aspect 3005 of the protective panel 1000 wherein the border 3000 is visible from a second side 3010 of the protective panel when the protective panel is affixed with a first side against a structure. The border 3000 of certain embodiments comprises a width 3020 offset from the extents 3030 of a protective panel and provides a visual cue to installers to not place fasteners within the border. It will be appreciated that a border 3000 of as discussed herein may comprise a line, an area of different color or patterning differing from the surrounding area, instructive words, or a combination thereof while being within the spirit and scope of the present invention.

A protective panel of certain embodiments, as shown in FIG. 3A, comprise a border 3000 visible from an external aspect 3005 of the protective panel. The border 3000 of certain embodiments comprises a visual guide indicating an area which a user should not affix fasteners 3040 within when fastening the protective panel to a structure. Thus, the border provides a visual cue for the proper fastening of the protective panel 1000 to a structure with a minimum offset 3020 such that the fastener 3040 is not at risk of tearing through the extent 3030 or edge of the protective panel as a result of an impact event. Certain embodiments, for instance, comprise a border 3020 having a width of 7.62 cm (3 in). Thus, an installer is thereby directed to not place fasteners 3040 within 7.62 cm (3 in) of the extents of the protective panel 1000.

Figure 4A:
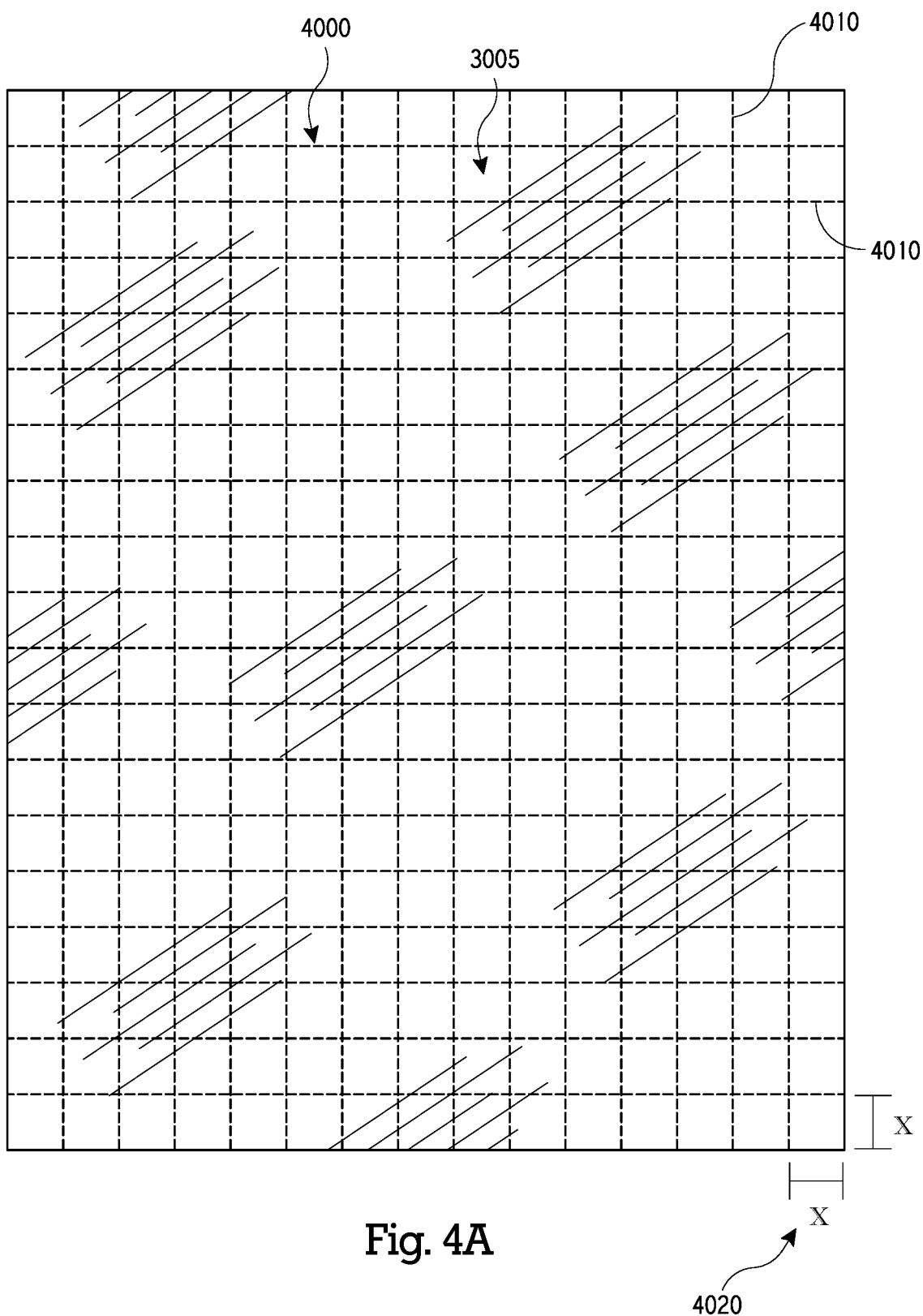
Figure 4B:
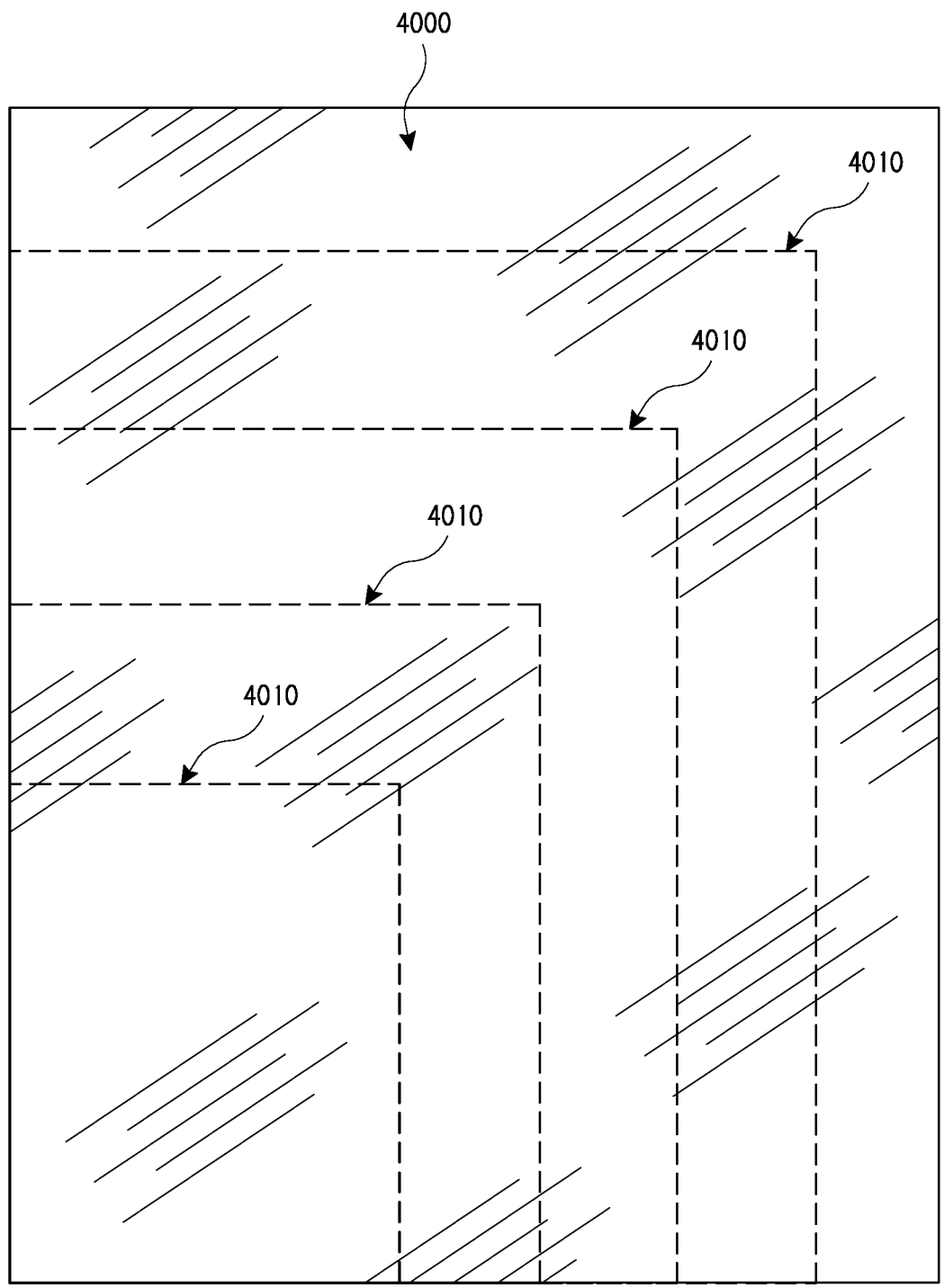

A protective panel 1000 of certain embodiments, such as shown in FIG. 4A and FIG. 4B comprises a cutting guide 4000 visible from an external aspect 3005 of the protective panel. The cutting guide of certain embodiments, as shown in FIG. 4A, comprises orthogonally oriented lines 4010 creating a rectilinear pattern wherein the lines 4010 are equally spaced from each other. The lines 4010 of the cutting guide of certain embodiments are spaced 7.62 cm (3 in) apart. It will be appreciated that the spacing of such lines 4010—such as when indicating maximum spacing 4020 of fasteners for the attachment to a structure—is dependent upon physical properties of the protective panel, fastener diameter, and fastener offset from the extents of the protective panel. In certain embodiments, as shown in FIG. 4B, the cutting guide 4000 comprises lines 4010 indicating panel sizes for common fenestration sizes allowing an installer to cut the protective panel 1000 quickly without requiring measuring the fenestration. Thus, it will be appreciated that alternative embodiments having alternative grid line 4010 spacing (such as 2 inches or 1 inch apart) are within the spirit and scope of the present invention. In certain embodiments, the cutting guide 4000 comprises lines 4010 that are marked with the spacing units (i.e., such as 1 inch increments) allowing an installer to quickly cut the protective panel 1000 to the desired size without the need for a measuring tape or other measuring tool. In other embodiments, the cutting guide can comprise one or more common fenestration sizes such as common window size openings in the geographic area where the panels are to be sold or distributed.

Figure 3B:
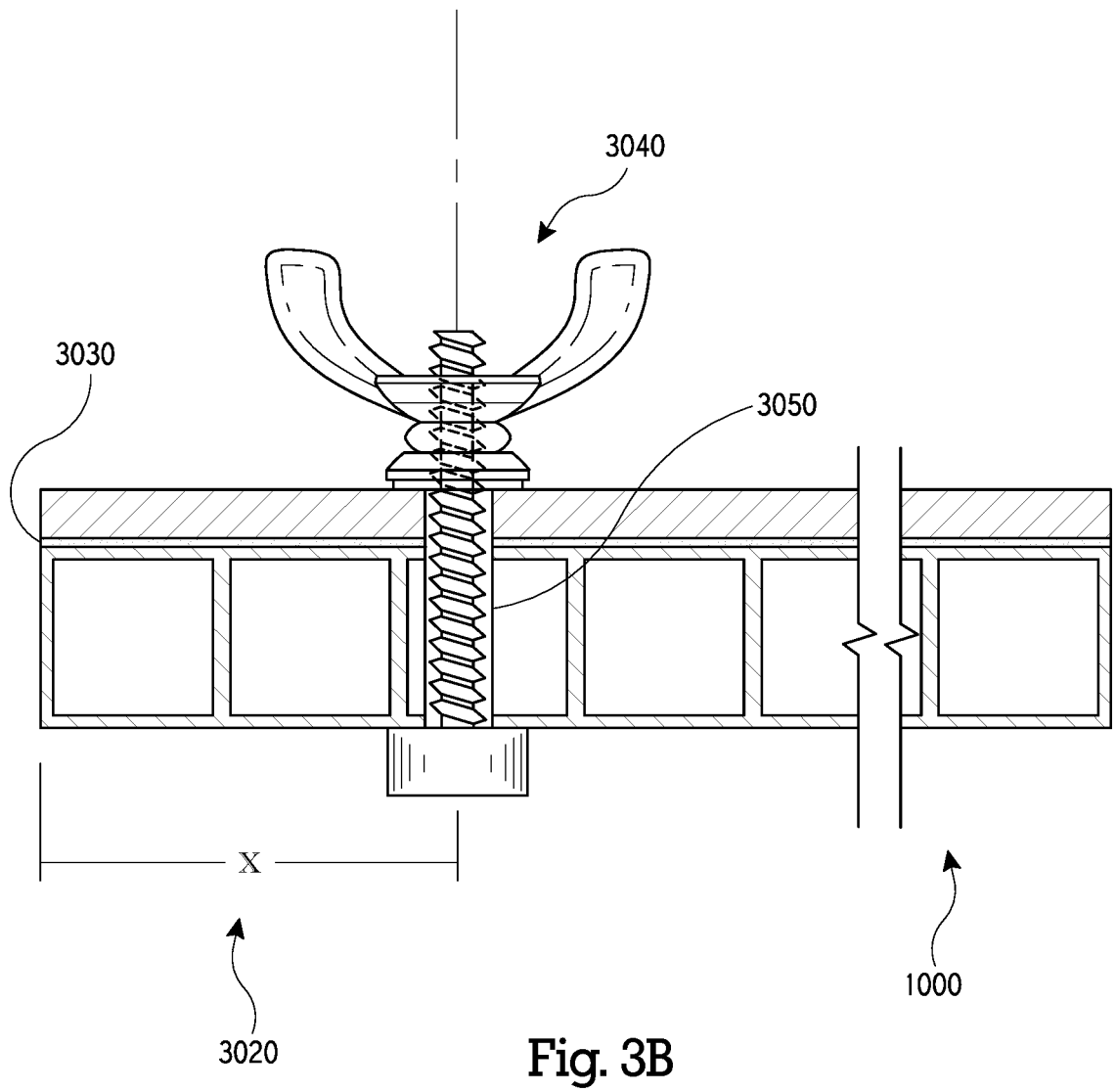
Figure 5:
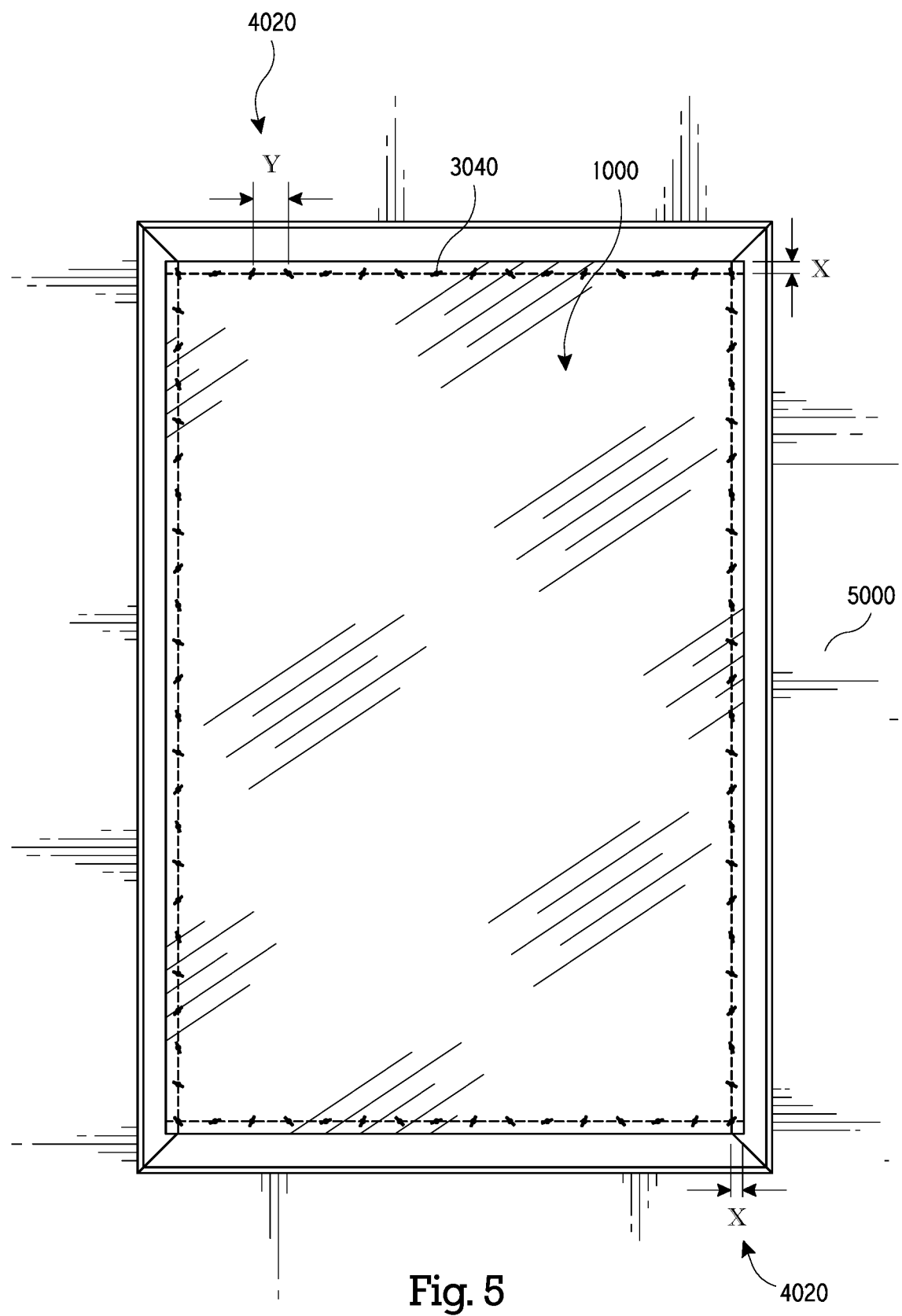

A protective panel 1000 of certain embodiments, as shown in FIG. 5, is fastened to a structure 5000 by means of one or more of the following fasteners 3040: screw fasteners, nails, countersunk reusable threaded holes, hook-and-loop fasteners. In certain embodiments, for instance those requiring the penetration of the protective panel with a mechanical fastener such as a screw or nail, apertures 3050 (FIG. 3) are pre-installed in the panels with a minimum offset 3020 from the extents 3030 of the protective panel, and a maximum spacing 4020 for the installation of fasteners 3040. Such apertures 3050 can be preinstalled by way of drilling, punching, hot melted, plasma cut, laser cut, or by other methods known to those skilled in the art.

A protective panel of certain embodiments, shown in FIG. 1 and FIG. 2A, comprises a substrate panel 1010 having a fluted construction with a fire retardant and UV stable polypropylene material composition. The substrate panel 1010 of certain embodiments comprises a density between about 200 g/m$^3$ and 5000 g/m$^3$ and a thickness 1030 between 2 mm (0.078 in) and 12 mm (0.472 in). Certain embodiments comprise a security film 1020 having a thickness 1060 between about 0.025 mm (0.001 in) and 1.27 mm (0.05 in). In certain embodiments it may be desired for the thickness 1060 of the security film to be between about 0.05 mm (0.002 in) and 0.5 mm (0.02 in). The security film 1020 is attached to a first side 1011 of the substrate panel. Although certain embodiments of substrate panels and security films have been disclosed herein, it will be appreciated that embodiments comprising substrate panels or films outside the thicknesses disclosed herein are within the spirit and scope of the present invention.

Figure 6:
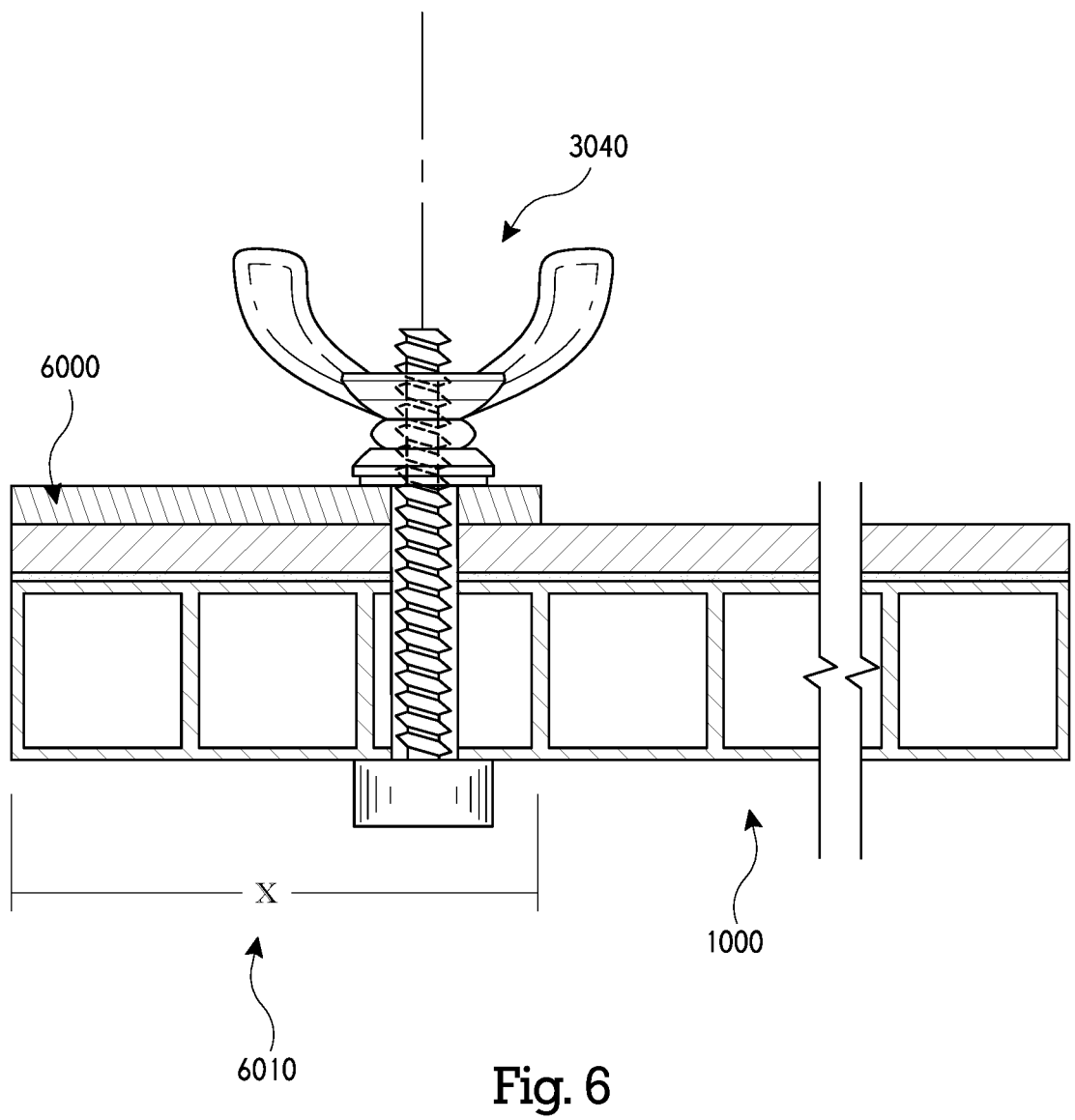

A protective panel of certain embodiments, as shown in FIG. 6, comprises a reinforced area 6000 adjacent to the extents 3030 of the protective panel. The reinforced area 6000 having a width 6010, is intended to further mitigate tear-through, and comprises an additional layer of material discussed herein. Accordingly, a reinforced area of 6000 embodiments comprises an additional layer of material such as those used for security film or substrate panel. In certain embodiments a reinforced area comprises a different material composition having higher tensile strength or higher shear strength than the portion of the protective panel 1000 outside the reinforced area. In certain embodiments the reinforced area overlaps a portion or entirety of a border of the protective panel.

Figure 7:
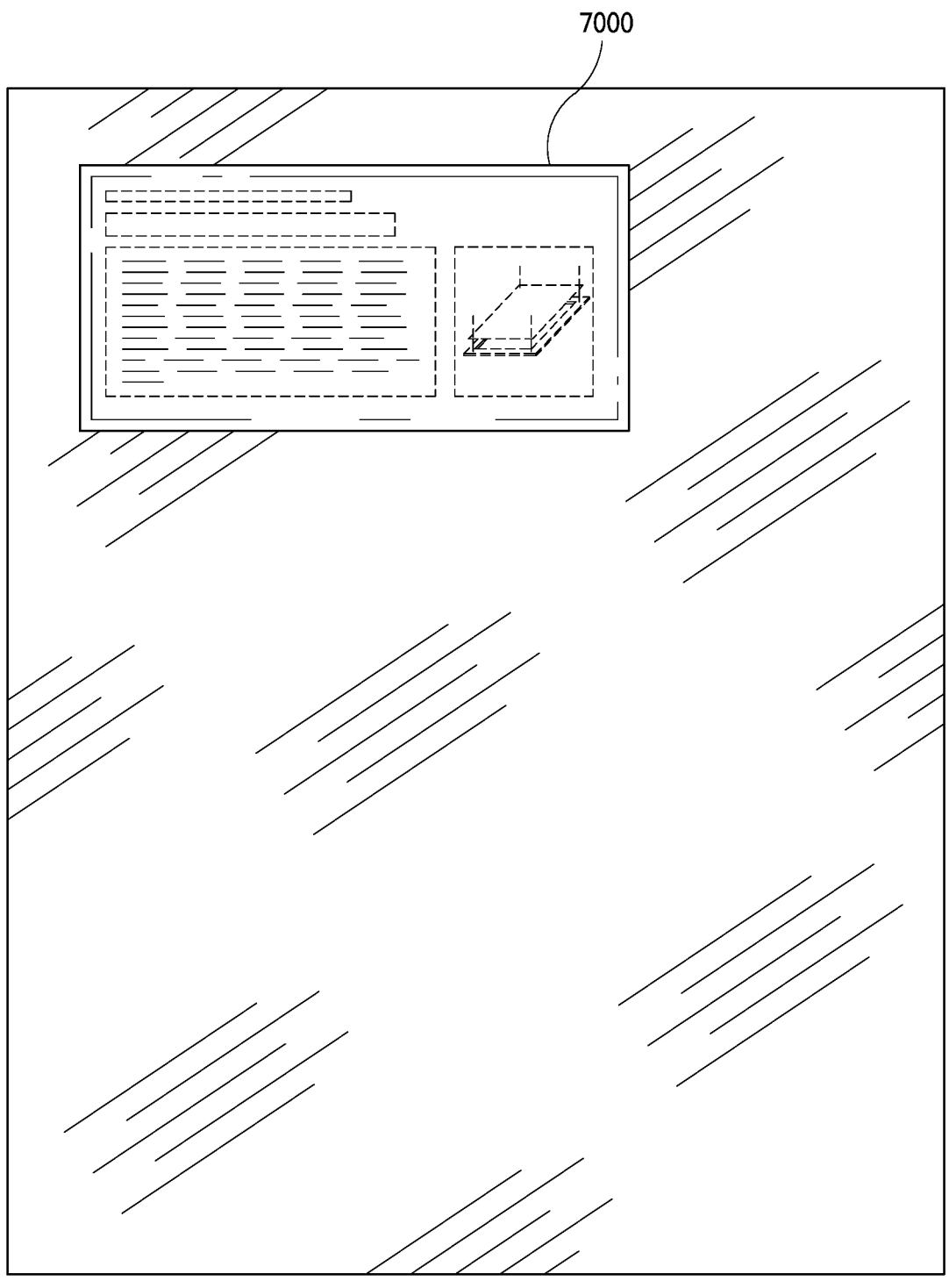

Certain embodiments comprising a protective panel, as shown in FIG. 7, comprise printed information 7000 on the protective panel 1000. The printed information 7000 of certain embodiments code compliance information, installation instructions, installation diagrams, or other instructional information pertaining to the operation or installation of the protective panel 1000. In certain embodiments (not shown), a protective panel comprises printed matter including imagery resembling a window or other imagery such wherein the installation of a protective panel resembles the structure or fenestration which it protects.

A protective panel of certain embodiments comprises a color temperature of light transmission wherein light transmits through the panel is affected such that the transmitted light provides a color temperature. It will be appreciated to those skilled in the art that color temperature as related to light transmission is commonly measured on the Kelvin (K) scale wherein a color temperature below 3000K is consistent with early morning light and incandescent light. Light having a temperature below 3000K often referred to as a "warm." Color temperatures in the 3000-4000 range are commonly referred to as "mid-range," while those above 4000K are considered "white" which enhances the blue light spectrum, flattens the red-light spectrum. Light above 5000K is associated with mid-day sunlight and outdoor natural lighting on a sunny day. It will be appreciated warm light is associated with providing a calming effect while "white" light is associated with providing a true view of colors and has an awakening effect on those around it. It is within the spirit and scope of the present invention for certain embodiments to comprise a protective panel having warm light transmission properties, alternative embodiments to comprise a protective panel having a mid-range light transmission properties, and further alternative embodiments to comprise a protective panel having a white light transmission properties. Certain embodiments comprise a panel having light transmissive properties of over 15%. Certain embodiments comprise a light transmissive property of 25%.

A protective panel of certain embodiments comprises integrated lighting wherein the panel produces light which is transmitted to at least one side of the protective panel. Integrated lighting in certain embodiments comprises integrated lights with a power source such as a battery, while alternative embodiments comprise a luminescent compound or luminescent pigment. It will be appreciated to those skilled in the art that luminescence as applied to the present invention surrounds the emission of light by a substance not resulting from applied heat. Luminescence includes but is not limited to chemiluminescence, bioluminescence, electroluminescence, and photoluminescence.

While various embodiments of the present invention have been described in detail, it is apparent that modifications and alterations of those embodiments will occur to those skilled in the art. However, it is to be expressly understood that such modifications and alterations are within the scope and spirit of the present invention. Further, the inventions described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

What is claimed is:

1. A protective panel comprising:
   a translucent substrate panel comprising an array of flutes, the substrate panel having a first side and a second side;
   a first security film having a first side and a second side, the first security film comprising one of polyester, polyethylene terephthalate, polyethylene terephthalate glycol, acrylic, polycarbonate, polyvinyl chloride, phenolics, ultra-high molecular weight polyethylene, acrylonitrile butadiene styrene, polyoxymethylene, polyamide-imide, polyimide, or nylon;
   wherein the first side of the security film is attached to the first side of the substrate panel;
   wherein the protective panel is configured to be affixed over an opening of a building structure with the second side of the substrate panel toward the opening.

2. The protective panel of claim 1, wherein the first security film is attached to the substrate panel by an adhesive comprising one of vinyl acetate, polyvinyl acetate, cyanoacrylate, hot melt polymer, epoxy, polyurethane, or a water-based adhesive.

3. The protective panel of claim 2, wherein the adhesive is applied to the substrate panel by one of spray application, roll-on, brush-on, dipping, knife rolling, vacuum deposition, or powder coating.

4. The protective panel of claim 1, wherein the first security film is attached to the substrate panel by lamination.

5. The protective panel of claim 1, further comprising a border visible from the second side of the first security film, and wherein the border indicates an area inset from the extents of the protective panel in which fasteners should not be placed.

6. The protective panel of claim 1, further comprising a reinforced area adjacent to extents of the protective panel.

7. The protective panel of claim 1, further comprising a plurality of apertures adjacent to the extents of the protective panel.

8. The protective panel of claim 1, further comprising printed matter visible from an external aspect of the protective panel, wherein the printed matter comprises at least one of installation instructions, code compliance information, a border, or imagery.

9. The protective panel of claim 1, comprising an integrated luminescent compound.

10. The protective panel of claim 1, comprising integrated lights.

11. The protective panel of claim 1, further comprising a second security film having a first side attached to the second side of the substrate panel.

12. The protective panel of claim 11, wherein the first and second security films are attached to the substrate panel by an adhesive.

13. The protective panel of claim 11, further comprising:
   a border visible from the external aspect of the protective panel having a width extending from extents of the protective panel; and
   wherein the border indicates an area of the protective panel in which fasteners should not be placed.

14. The protective panel of claim 11, further comprising a reinforced area adjacent to extents of the protective panel.

15. The protective panel of claim 11, further comprising:
   printed matter visible from an external aspect of the protective panel; and
   wherein the printed matter comprises at least one of installation instructions, code compliance information, a border, or imagery.

16. A protective panel comprising:
   a substrate panel comprising a fluted plastic construction, the substrate panel having a first side and a second side;
   a security film having a first side and a second side, the first side of the security film affixed to the first side of the substrate panel;
   a cutting guide visible from an external aspect of the protective panel; and
   wherein the protective panel is configured to be attached to a building structure by fasteners disposed through the panel and into the structure with the second side of the substrate panel toward the structure.

17. The protective panel of claim 16, wherein the security film is attached to the substrate panel by an adhesive comprising one of vinyl acetate, polyvinyl acetate, cyanoacrylate, hot melt polymer, epoxy, polyurethane, or a water-based adhesive.

18. The protective panel of claim 16, wherein the security film is attached to the substrate panel by lamination.

19. The protective panel of claim 16, further comprising printed matter visible from an external aspect of the protective panel, wherein the printed matter comprises at least one of installation instructions, code compliance information, a border, or imagery.

20. The protective panel of claim 16, further comprising a plurality of apertures adjacent to the extents of the protective panel.

* * * * *